UNITED STATES PATENT OFFICE 2,232,870

AZO DYESTUFFS

Hans Roos, Leverkusen I. G.-Werk, Germany, assignor to General Aniline & Film Corporation, a corporation of Delaware No Drawing. Application August 15, 1939, Serial No. 290,233. In Germany September 1, 1938

6 Claims. (Cl. 260—199)

The present invention relates to new valuable azo dyestuffs; more particularly it relates to azo dyestuffs of the following formula

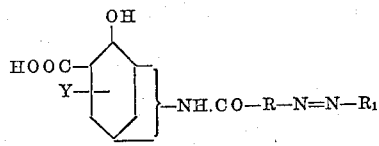

In this formula R stands either for the radical

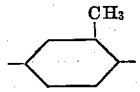

or for the radical

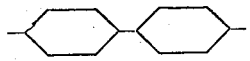

$R_1$ stands for the radical of an N-substituted 2-amino-5-hydroxynaphthalene-7-sulfonic acid, the —N=N— bridge, shown in the above formula, being attached to the 6-position of the naphthalene nucleus, and Y stands for hydrogen or a substituent such as alkyl, halogen or $SO_3H$.

My new dyestuffs are obtained by coupling diazotized [4'-amino-3'-methyl]- or [4'-(4''-aminophenyl)]-benzoylamino-2-hydroxybenzene carboxylic acids, their homologues and substitution products which correspond to the following formulae

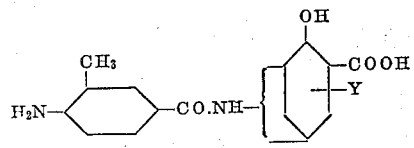

and

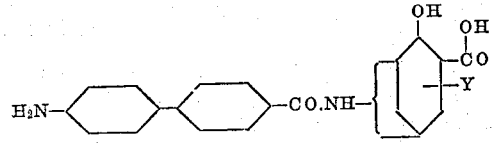

Y having the above significance, with an N-substituted 2-amino-5-hydroxynaphthalene-7-sulfonic acid. The N-substituent may contain a diazotizable amino group; in this case it is possible to further diazotize the monoazo dyestuffs obtained and to couple them in substance or on the fiber with the usual coupling components.

As N-substituted 2-amino-5-hydroxynaphthalene-7-sulfonic acids may be mentioned: the benzo derivatives of 2-amino-5-hydroxynaphthalene-7-sulfonic acid such as benzo-1.2-naphthimidazole-J-acid, benzo-1.2-naphthothiazole-J-acid, the corresponding compounds containing an amino group in the benzo radical, benzoyl-J-acid, amino-benzoyl-J-acids which may be further substituted in the benzoyl radical by the methyl group; further phenyl-J-acid, acetyl-J-acid, the ureas of J-acid and so on.

For this process and for the dyestuffs obtained thereby it is of no importance whether the particular amino aroylated aminosalicylic acids are derived from 5-amino-2-hydroxybenzene carboxylic acid or from 3-amino-2-hydroxybenzene carboxylic acid. The dyestuffs containing either of these aminosalicylic acids and being otherwise built up by the same components are fully identical in their properties.

In German specification No. 366,530 a process for the manufacture of substantive disazodyestuffs is described which consists in coupling with α-naphthol sulfonic acids diazotized monoazodyestuffs prepared from p-aminoaroyl-aminosalicylic acids, their homologues and substitution products, and such amino-substituted derivatives of 2.5.7-aminonaphthol sulfonic acid as contain a substituent with a diazotizable amino group. The dyestuffs obtained according to this process are distinguished by a good fastness to light and water.

Further in German specification No. 268,791 a process for the manufacture of monoazodyestuffs is described which consists in coupling the diazo compounds of amino-acidyl-aminosalicylic acids, their homologues and substitution products with azodyestuff components of the benzene and naphthalene series. The dyestuffs described in this specification possess good fastness properties.

It was, therefore, surprising that, when using as diazo components derivatives of p'-aminobenzoylamino-2-hydroxybenzene carboxylic acids differing from those used and disclosed in German specifications No. 366,530 and No. 268,791, dyestuffs are obtained which, while possessing the same good fastness to light as the known dyestuffs, are distinguished by an increased fastness to water. The increase of fastness to water is in some cases of such a degree that it is not necessary to convert the monoazodyestuffs into disazodyestuffs, the monoazodyestuffs themselves can already be used. Thus, for instance, the dyestuff of Example 1 of the German specification No. 366,530, before the second coupling with 1-hydroxynaphthalene-4-sulfonic acid has taken place, shows a fastness to water which is not sufficient for practical purposes, while the fastness to water of the corresponding new monoazodyestuff built up from 5-(3'-methyl-4'-aminobenzoylamino)-2-hydroxybenzene carboxylic acid is fully sufficient. The same applies to a dyestuff built up from 5-[4'-(4''-aminophenyl)-benzoylamino]-2-hydroxybenzene carboxylic acid. For this reason it is not absolutely necessary for the new dyestuffs to contain in the N-substituent of the 2-amino-5-hydroxynaphthalene-7-sulfonic acid a diazotizable amino group. It has further been found that in case the new monoazodyestuffs are diazotizable, their diazo compounds can not only be coupled with 1-hydroxynaphthalene sulfonic acids, as disclosed in German specification No. 366,530, but also with other usual coupling components as e. g. with 2-hydroxynaphthalene sulfonic acids, pyrazolones, resorcinol and so on.

The following examples illustrate my invention without, however, restricting it thereto, the parts being by weight.

Example 1

28.6 parts of 5-(4'-amino-3'-methylbenzoylamino)-2-hydroxybenzene carboxylic acid are dissolved in 400 parts of water with caustic soda lye to a neutral solution, a solution of 7 parts of sodium nitrite is added and this mixture is allowed to run into a solution of 28 parts of hydrochloric acid 19.5° Bé. in 200 parts of water. The diazotization is finished in about 1 hour at room temperature. The diazotization mixture is run to a neutral solution of 38 parts of 5-hydroxy-1.2-(3'-aminophenyl)-naphthimidazole-7-sulfonic acid to which 35 parts of sodium bicarbonate are added. In order to isolate the dyestuff the mixture is heated to 70° C. and salt is added.

The dyestuff corresponds in its free state to the following formula

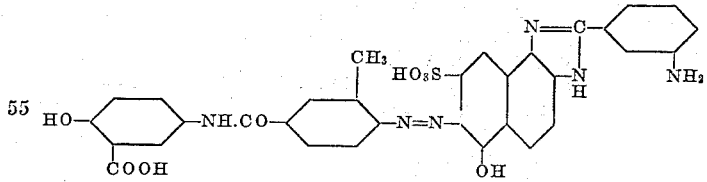

and dyes cotton red shades of good fastness to light which are distinguished by a very good fastness to water. Of course, the dyestuff may be diazotized on the fiber and developed with 2-hydroxynaphthalene or 1-phenyl-3-methyl-5-pyrazolone or also after-treated with formaldehyde by which steps the fastness to washing is improved.

If the above dyestuff is diazotized in substance and coupled in a solution rendered alkaline with sodium carbonate with 1-hydroxynaphthalene-4-sulfonic acid a dyestuff is obtained dyeing a somewhat more bluish-red than the corresponding dyestuff described in Example 1 of German specification No. 366,530 and being distinguished over this dyestuff by a superior fastness to water.

Very similar dyestuffs are obtained if in this example instead of 5-hydroxy-1.2-(3'-aminophenyl)-naphthimidazole-7-sulfonic acid 5-hydroxy-1.2-(3'-aminophenyl)-naphthothiazole-7-sulfonic acid is used.

Example 2

In the manner described in Example 1 30 parts of 5-(4'-amino-3'-methylbenzoylamino)-3-methyl-2-hydroxybenzene carboxylic acid are diazotized and coupled with 36 parts of 2-(4'-aminobenzoylamino)-5-hydroxynaphthalene-7-sulfonic acid in a solution containing sodium bicarbonate. The dyestuff thus obtained corresponds in its free state to the following formula

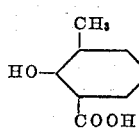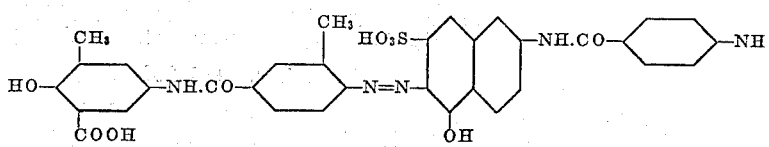

and dyes in comparison with the dyestuffs of Example 1 cotton yellower shades which are chiefly distinguished from those by a very good dischargeability.

Also this dyestuff can be aftertreated with formaldehyde, diazotized on the fiber and developed without losing its good dischargeability. The same applies if the dyestuff is diazotized in substance and coupled, for instance, in the usual manner with 1-(4'-sulfophenyl)-5-pyrazolone-3-carboxylic acid. This disazodyestuff dyes cotton orange shades which are distinguished over the corresponding dyestuff which is not substituted by a methyl group in the benzoyl radical of the aminobenzoylaminosalicylic acid by an improved fastness to water.

Corresponding dyestuffs are obtained if for the second coupling 1-hydroxynaphthalene-4-sulfonic acid, -5-sulfonic acid or -3-sulfonic acid or the corresponding aminonaphthalenesulfonic acids are used. A very interesting dyestuff is obtained if for the second coupling 1-(3'-aminophenyl)-5-pyrazolone-3-carboxylic acid is used; it is a technically valuable scarlet of good fastness to light and good dischargeability which can be diazotized and coupled, aftertreated with formaldehyde or developed with diazotized nitranilines.

Somewhat more bluish shades are obtained if in this example instead of 2-(4'-aminobenzoylamino)-5-hydroxynaphthalene-7-sulfonic acid 2-(4'-amino-3'-methylbenzoylamino)-5-hydroxynaphthalene-7-sulfonic acid is used as first coupling component.

Dyestuffs dyeing the same shades and possessing the same properties are obtained if in this example instead of 5-(4'-amino-3'-methyl-benzoylamino)-3-methyl-2-hydroxybenzene carboxylic acid the diazo component of Example 1, viz. 5-(4'-amino-3'-methylbenzoylamino)-2-hydroxybenzene carboxylic acid is employed.

Example 3

36.6 parts of 5-(4'-amino-3'-methylbenzoylamino)-2-hydroxybenzene-1-carboxylic acid-3-sulfonic acid are diazotized at room temperature with 7 parts of sodium nitrite and 28 parts of hydrochloric acid 19.5° Bé. and thereupon coupled with 36 parts of 2-(4'-aminobenzoylamino)-5-hydroxynaphthalene-7-sulfonic acid in the presence of 35 parts of sodium bicarbonate. The coupling is soon finished and the monoazodyestuff thus obtained is, after adding hydrochloric acid, further diazotized with 7 parts of sodium nitrite. When the amino group is completely diazotized 21 parts of 1-phenyl-5-pyrazolone-3-carboxylic acid are added and neutralized to a pH of about 5 with sodium acetate solution. After 10–12 hours the dyestuff-formation is completed and the dyestuff is isolated by rendering the mixture alkaline with sodium hydroxide. The dyestuff corresponds in its free state to the following formula $$\text{HO-}\langle\rangle\text{-NH.CO-}\langle\rangle\text{-N=N-}\langle\langle\rangle\rangle\text{-NH.CO-}\langle\rangle\text{-N=N-CH---C-CO}$$
(with SO₃H, COOH, HO₃S, OH, O=C, N, phenyl substituents)

and dyes cotton orange shades of similar properties as the dyestuff described in Example 2 containing 1-(4'-sulfophenyl)-5-pyrazolone-3-carboxylic acid as final component but is rather somewhat faster to light.

Example 4

43.9 parts of [4'-(4''-aminophenyl)-benzoylamino]-2-hydroxybenzene carboxylic acid are slurried in water and diazotized with 7 parts of sodium nitrite and 28 parts of hydrochloric acid 19.5° Bé. at room temperature; the diazotization is completed after about 2 hours. The diazotization mixture is allowed to run to a neutral solution of 42 parts of the mixed urea from 2-amino-5-hydroxynaphthalene-7-sulfonic acid and 1-amino-4-acetaminobenzene to which solution 35 parts of sodium bicarbonate have been added. The dyestuff thus obtained, corresponds in its free state to the following formula $$\text{HO-}\langle\rangle\text{-NH.CO-}\langle\rangle\langle\rangle\text{-N=N-}\langle\langle\rangle\rangle\text{-NH.CO.HN-}\langle\rangle\text{-NH.CO-CH}_3$$
(with COOH, HO₃S, OH substituents)

and dyes cotton red shades fast to light, which are very good dischargeable and especially distinguished by a very good fastness to water. Similar dyestuffs are obtained if as coupling components 2-acetylamino-5-hydroxynaphthalene-7-sulfonic acid or 2-benzoylamino-5-hydroxynaphthalene-7-sulfonic acid are used. A much more bluish dyestuff of very similar properties is obtained with 2-phenylamino-5-hydroxynaphthalene-7-sulfonic acid as coupling component.

Example 5

43.9 parts of 5-[4'-(4''-aminophenyl)-benzoylamino]-2-hydroxybenzene carboxylic acid are diazotized in the manner described in Example 3 and also in the same way coupled with 36 parts of 2-(4'-aminobenzoylamino)-5-hydroxynaphthalene-7-sulfonic acid. The dyestuff obtained corresponds in its free state to the following formula $$\text{HO-}\langle\rangle\text{-NH.CO-}\langle\rangle\langle\rangle\text{-N=N-}\langle\langle\rangle\rangle\text{-NH.CO-}\langle\rangle\text{-NH}_2$$
(with COOH, HO₃S, OH substituents)

and dyes cotton clear bluish red shades which are distinguished by a very good fastness to water and whose fastness to washing can be improved by an aftertreatment with formaldehyde. The dyestuff can, of course, also be diazotized and developed on the fiber with the usual developers whereby, for instance, with 2-hydroxynaphthalene very clear red shades of good dischargeability and good fastness to washing are obtained. Somewhat more bluish shades are obtained, if as coupling component the 2-(4'-amino-3'-methylbenzoylamino)-5-hydroxynaphthalene-7-sulfonic acid is used and somewhat more yellowish shades with 2-(3'-aminobenzoylamino)-5-hydroxynaphthalene-7-sulfonic acid as coupling component.

Also these dyestuffs may be diazotized in the usual manner in substance and combined with coupling components mentioned in Example 2 whereby dyestuffs are obtained yielding distinctly more bluish shades than the dyestuffs of Example 2. They are distinguished by an excellent fastness to water. Thus the dyestuff, formed with 1.3-dihydroxybenzene as second coupling component, possesses a remarkably good fastness to water and washing.

If in all these examples the aminoaroylated 3-amino-2-hydroxybenzene carboxylic acid is substituted for the aminoaroylated 5-amino-2-hydroxybenzene carboxylic acid dyestuffs of fully identical properties are obtained.

I claim.

1. As new products azodyestuffs of the general formula

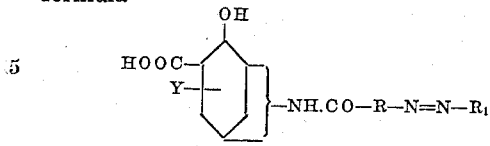

wherein R stands for one of the radicals

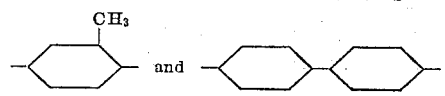

$R_1$ stands for a radical selected from the group consisting of 2-acylamino-5-hydroxynaphthalene-7-sulfonic acid, 2-aroylamino-5-hydroxynaphthalene - 7 - sulfonic acid, 1.2-naphthimidazole-5-hydroxynaphthalene-7-sulfonic acid, 1.2-thiazole-5-hydroxynaphthalene - 7 - sulfonic acid, and 2-aryl-amino-5-hydroxynaphthalene-7-sulfonic acid, the —N=N—bridge shown being attached to the 6-position of the naphthalene nucleus, and Y stands for a radical selected from the group consisting of hydrogen, alkyl, halogen and $SO_3H$.

2. As new products azodyestuffs of the general formula

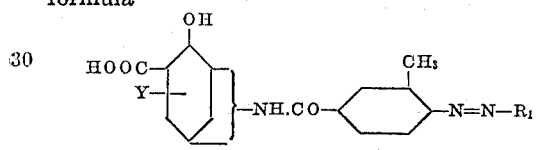

wherein $R_1$ stands for a radical selected from the group consisting of 2-acylamino-5-hydroxynaphthalene-7-sulfonic acid, 2-aroylamino-5-hydroxynaphthalene-7-sulfonic acid, 1.2-naphthimidazole-5-hydroxynaphthalene - 7 - sulfonic acid, 1.2-thiazole - 5-hydroxynaphthalene-7-sulfonic acid, and 2-aryl-amino-5-hydroxynaphthalene-7-sulfonic acid, the —N=N—bridge shown being attached to the 6-position of the naphthalene nucleus, and Y stands for a radical selected from the group consisting of hydrogen, alkyl, halogen and $SO_3H$.

3. As new products azodyestuffs of the general formula

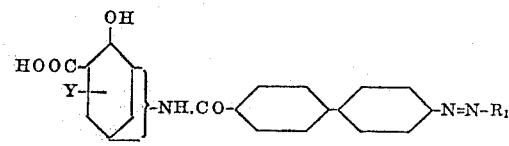

wherein $R_1$ stands for a radical selected from the group consisting of 2-acylamino-5-hydroxynaphthalene-7-sulfonic acid, 2-aroylamino-5-hydroxynaphthalene-7-sulfonic acid, 1.2-naphthimidazole-5-hydroxynaphthalene - 7 - sulfonic acid, 1.2-thiazole - 5-hydroxynaphthalene-7-sulfonic acid, and 2-aryl-amino-5-hydroxynaphthalene-7-sulfonic acid, the —N=N—bridge shown being attached to the 6-position of the naphthalene series, and Y stands for a radical selected from the group consisting of hydrogen, alkyl, halogen and $SO_3H$.

4. As new product the azodyestuff corresponding in its free state to the formula

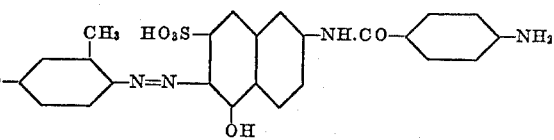

and dyeing cotton yellowish red shades of good fastness to light and water and of very good dischargeability.

5. As new product the azodyestuff corresponding in its free state to the following formula

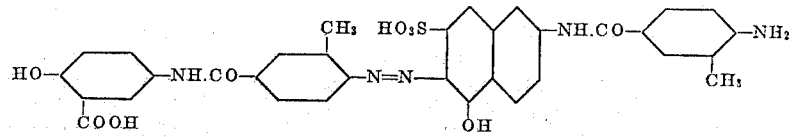

and dyeing cotton red shades of good fastness to light and water and of very good dischargeability.

6. As new product the azodyestuff corresponding in its free state to the formula

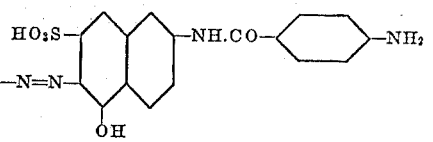

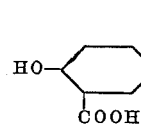

and dyeing cotton clear bluish red shades of very good fastness to water.

HANS ROOS.